US011321785B2

(12) United States Patent
Pei et al.

(10) Patent No.: US 11,321,785 B2
(45) Date of Patent: May 3, 2022

(54) SYSTEM AND METHOD FOR PROVIDING GLOBAL TAG SUGGESTIONS BASED ON USER INFORMATION AND TRANSACTION DATA

(71) Applicant: INTUIT INC., Mountain View, CA (US)

(72) Inventors: Lei Pei, Mountain View, CA (US); Meng Chen, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/863,535

(22) Filed: Apr. 30, 2020

(65) Prior Publication Data

US 2021/0342951 A1 Nov. 4, 2021

(51) Int. Cl.
*G06Q 40/00* (2012.01)

(52) U.S. Cl.
CPC .................. *G06Q 40/128* (2013.12)

(58) Field of Classification Search
None
See application file for complete search history.

(56) References Cited

U.S. PATENT DOCUMENTS

| | | | | |
|---|---|---|---|---|
| 7,363,233 | B1 * | 4/2008 | Levine | G06Q 10/04 705/1.1 |
| 8,601,019 | B1 | 12/2013 | Weininger | |
| 10,235,718 | B2 * | 3/2019 | Sukthanker | G06Q 20/10 |
| 11,023,511 | B1 * | 6/2021 | Fletcher | G06F 11/3495 |
| 2002/0194223 | A1 * | 12/2002 | Meyers | G06F 40/211 715/234 |
| 2012/0190386 | A1 * | 7/2012 | Anderson | G01S 19/14 455/456.3 |
| 2013/0215116 | A1 * | 8/2013 | Siddique | G06Q 20/204 345/420 |
| 2013/0282542 | A1 * | 10/2013 | White | G06Q 40/00 705/35 |
| 2015/0269639 | A1 * | 9/2015 | Mistriel | G06Q 50/01 705/319 |
| 2016/0267489 | A1 * | 9/2016 | Hodges | G06Q 30/018 |
| 2016/0267570 | A1 * | 9/2016 | Hodges | H04L 67/32 |
| 2017/0032257 | A1 | 2/2017 | Sharifi | |
| 2018/0018734 | A1 * | 1/2018 | Ho | G06Q 40/06 |
| 2018/0082197 | A1 | 3/2018 | Aravamudan | |
| 2018/0246983 | A1 * | 8/2018 | Rathod | G06F 16/9535 |
| 2019/0306107 | A1 * | 10/2019 | Galbraith | G06F 40/30 |
| 2020/0195729 | A1 * | 6/2020 | Bellam | G06F 11/0775 |
| 2021/0042724 | A1 * | 2/2021 | Rathod | G06Q 30/06 |
| 2021/0117486 | A1 * | 4/2021 | Turner | G06F 16/951 |
| 2021/0117889 | A1 * | 4/2021 | Turner | G06Q 10/06315 |

(Continued)

FOREIGN PATENT DOCUMENTS

WO    WO-2019193407 A1 * 10/2019    .......... G06F 16/9535

OTHER PUBLICATIONS

File History of U.S. Appl. No. 16/862,640, filed Apr. 30, 2020.
Partial File History History of U.S. Appl. No. 16/862,640, filed Apr. 30, 2020 (Sep. 28, 2021-present).

*Primary Examiner* — Fateh M Obaid
(74) *Attorney, Agent, or Firm* — DLA Piper LLP (US)

(57) ABSTRACT

Systems and methods that may be used to provide guidance and or tag suggestions to a user of an electronic accounting system and or service that overcome the shortcomings associated with user-defined tags.

18 Claims, 10 Drawing Sheets

(56) References Cited

U.S. PATENT DOCUMENTS

2021/0118054 A1\* 4/2021 Turner .................. G06Q 10/10
2021/0303558 A1   9/2021 Setlur
2021/0303638 A1   9/2021 Zhong \* cited by examiner

| | | | | | |
|---|---|---|---|---|---|
| Type: All | Tags: All | Account: All | | Last 12 months | Search transactions 🔍 |

| | DATE | TRANSACTION | AMOUNT | TYPE | CATEGORY AND TAGS |
|---|---|---|---|---|---|
| Pending (3) | | | | | |
| 440a ☐ | 6/6/18 | Amazon.com<br>Credit card | -$35.00 | Business | Other business expenses<br>◇ Customer gift |
| 440b ☐ | 6/6/18 | Staples<br>Credit card | -$19.95 | Business | Office supplies/postage<br>◇ Johnson Project |
| 440c ☐ | 6/6/18 | Peet's Coffee<br>Credit card | -$2.88 | Personal | Personal spending |
| 440d ☐ | 6/6/18 | LegalZoom<br>Credit card | -$133.22 | Business | Legal and professional services<br>◇ Ask my accountant |
| 440e ☐ | 6/6/18 | B&H Camera Co<br>Credit card | -$320.00 | Business | Photo/video equipment (> $200)<br>◇ Rodriguez Project |
| 440f ☐ | 6/6/18 | Amnesty International<br>Credit card | -$50.00 | Personal | Personal spending<br>◇ Donation |
| 440g ☐ | 6/6/18 | Squarespace<br>Credit card | -$30.00 | Business | App/software/web services |

| Type: All | Tags: All | Account: All | Last 12 months | Search transactions |
|---|---|---|---|---|

| DATE | TRANSACTION | AMOUNT | TYPE | CATEGORY AND TAGS |
|---|---|---|---|---|
| Pending (3) | | | | |
| 6/6/18 | Amazon.com<br>Credit card | -$35.00 | Business | Other business expenses<br>◆ Studio Supplies  ◆ Reimbursible |
| 6/6/18 | Staples<br>Credit card | -$19.95 | Business | Office supplies/postage<br>◆ Johnson Project |
| 6/6/18 | Peet's Coffee<br>Credit card | -$2.88 | Personal | Personal spending |
| 6/6/18 | LegalZoom<br>Credit card | -$133.22 | Business | Legal and professional services<br>◆ Ask my accountant |
| 6/6/18 | B&H Camera Co<br>Credit card | -$320.00 | Business | Photo/video equipment (> $200)<br>◆ Rodriguez Project  ◆ Lenses |
| 6/6/18 | Amnesty International<br>Credit card | -$50.00 | Personal | Personal spending<br>◆ Donation |
| 6/6/18 | Squarespace<br>Credit card | -$30.00 | Business | App/software/web services |

FIG. 10

SYSTEM AND METHOD FOR PROVIDING GLOBAL TAG SUGGESTIONS BASED ON USER INFORMATION AND TRANSACTION DATA

BACKGROUND

Most accounting services allow their users to identify/label their transactions so that they can keep track of them, and their assets, liabilities, income and expenses. This feature is often referred to as "tagging" the transaction because the user or service may apply a "tag" describing and/or categorizing the transaction. When properly used, a tag should help the user understand what the transaction relates to (e.g., automobile expense, client gift, utility payment, etc.) to help better balance its books. It is desirable for users to tag invoices, expenses, and bills in a consistent manner. It is also desirable to group tags together so that reports can be run to see how specific areas of a user's business are doing.

Unfortunately, the tagging process currently relies on user-defined tags and or other descriptions or data. It has been observed, for example, that users may identify similar transactions with different tags. This could be the result of spelling errors or the user's unintended use of a different tag during the tagging of a subsequent transaction (e.g., the user changed a tag's spelling when creating a subsequent tag, the user used different words for the same item to describe different transactions e.g., car, auto, vehicle, to name a few). As can be appreciated, this is undesirable. Accordingly, there is a need and desire for a better a better tagging technique that overcomes the shortcomings associated with user-defined tags.

BRIEF DESCRIPTION OF THE FIGURES

FIGS. 5 to 10 illustrate example pages and or features of an accounting user interface in accordance with the disclosed principles.

DETAILED DESCRIPTION OF SEVERAL EMBODIMENTS

Figure 1:
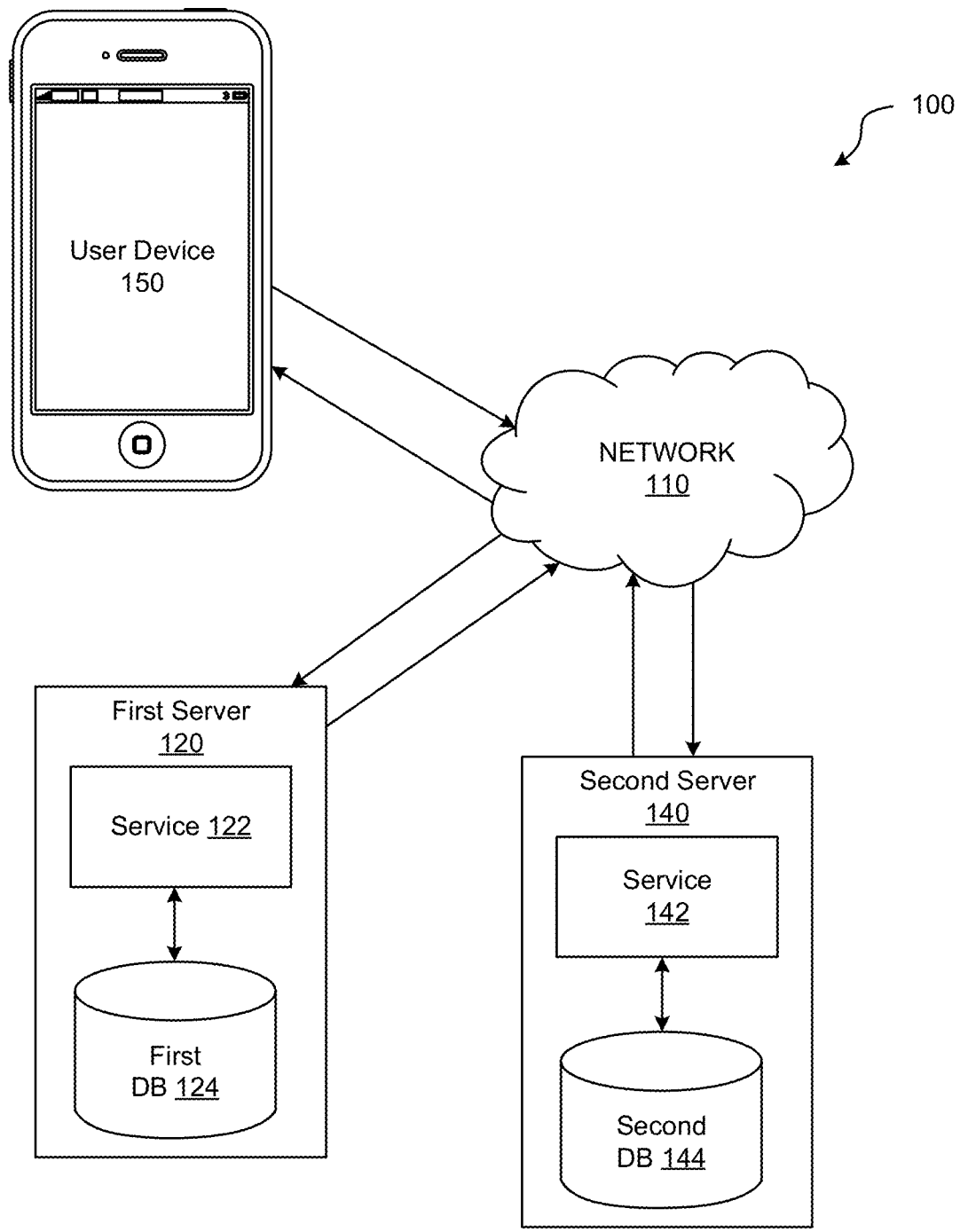
FIG. 1 shows an example of a system configured to implement a process for providing global tag suggestions in accordance with an embodiment of the present disclosure.

Embodiments described herein may be used to provide an automated method of providing tag suggestions to a user when a user is tagging a transaction in e.g., an electronic accounting system and or service. In one or more embodiments, the tag suggestions are based one or more global tags developed based on the processing of information and or transaction data from a plurality of users of the accounting system and or service. As used herein, a "tag" is an interactive keyword assigned to a piece of information that may help a user describe, find, and organize that information. A "global tag" is a tag that may be available to all users of the system and or service.

Most accounting services allow users to identify their business' accounts in a listing or collection of accounts to help them balance their books and or prepare tax forms. For example, QuickBooks® Online by Intuit® of Mountain View Calif. includes a "Chart of Accounts" feature allowing its users to identify various accounts associated with their business to help organize their transactions so that the users know how much money they have and or owe in each account. Use of account names from the Chart of Accounts or a similar collection of accounts may be a good mechanism for developing global tags that may be used by all users of the service to tag transactions.

These collection of accounts, however, may still include user-defined information and may have some of the same issues as user-defined tags (e.g., inconsistent term usage, spelling and other errors). For example, different users may create similar accounts with minor differences in names, which makes the number of accounts scale up rapidly. Moreover, users may create duplicate similar accounts because he/she may not have remembered the prior name used or had a typographical when the prior one was created. Thus, without more, the collection of accounts data may create tags based on unreliable data similar to free form text entries.

To this end, the disclosed principles may begin developing global tags based on data input from the collection of accounts of only predetermined select system users such as e.g., high quality and active users and or users with certain predetermined backgrounds. For example, users having an accounting and or other financial background may be more likely to consistently label their accounts. Thus, data from these collection of accounts may provide a better source for global tags than the data from other users' collection of accounts. Similarly, users that access and update their accounts on a regular basis (referred to herein as "active users") may also be more likely to consistently label their accounts than other users. Thus, data from active users' collection of accounts may also provide a better source for global tags than the data from other users' collection of accounts.

In one or more embodiments, the input data from the select system users (e.g., high quality and or active users) may be cleaned and then clustered in groups. The identity and or name of the clustered groups may be used as the identity/name for global tags that may be suggested to all users when interacting with the accounting service. In one or more embodiments, the disclosed principles may update the collection of global tags with personalized tags developed by users over time. As can be appreciated, a "personalized tag" may be a tag entered by a specific user that is not found in the collection of global tags used by the service.

FIG. 1 shows an example of a system 100 configured to implement a process for providing global tag suggestions according to an embodiment of the present disclosure. System 100 may be or include an electronic accounting system and may include a first server 120, second server 140, and/or a user device 150. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to implement a first service 122, which in one embodiment may be used to input data suitable for developing, suggesting and supplementing global tags in accordance with the disclosed principles. In one or more embodiments, the data may be input via network 110 from one or more databases 124, 144, the second server 140 and/or user device 150. For example, first server 120 may execute the process for providing global tag suggestions according to the disclosed principles using data stored in database 124, database 144 and or received from second server 140 and/or user device 150. First service 122 or second service 142 may implement an accounting service, other financial service and or information service, which may maintain data used throughout the process for providing global tag suggestions. The accounting, financial and or information services may be any network 110 accessible service such as QuickBooks®, QuickBooks® Online, QuickBooks® Self Employed, and their respective variants, offered by Intuit® of Mountain View Calif.

User device 150 may be any device configured to present user interfaces and receive inputs thereto. For example, user device 150 may be a smartphone, personal computer, tablet, laptop computer, or other device.

First server 120, second server 140, first database 124, second database 144, and user device 150 are each depicted as single devices for ease of illustration, but those of ordinary skill in the art will appreciate that first server 120, second server 140, first database 124, second database 144, and/or user device 150 may be embodied in different forms for different implementations. For example, any or each of first server 120 and second server 140 may include a plurality of servers or one or more of the first database 124 and second database 144. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 2:
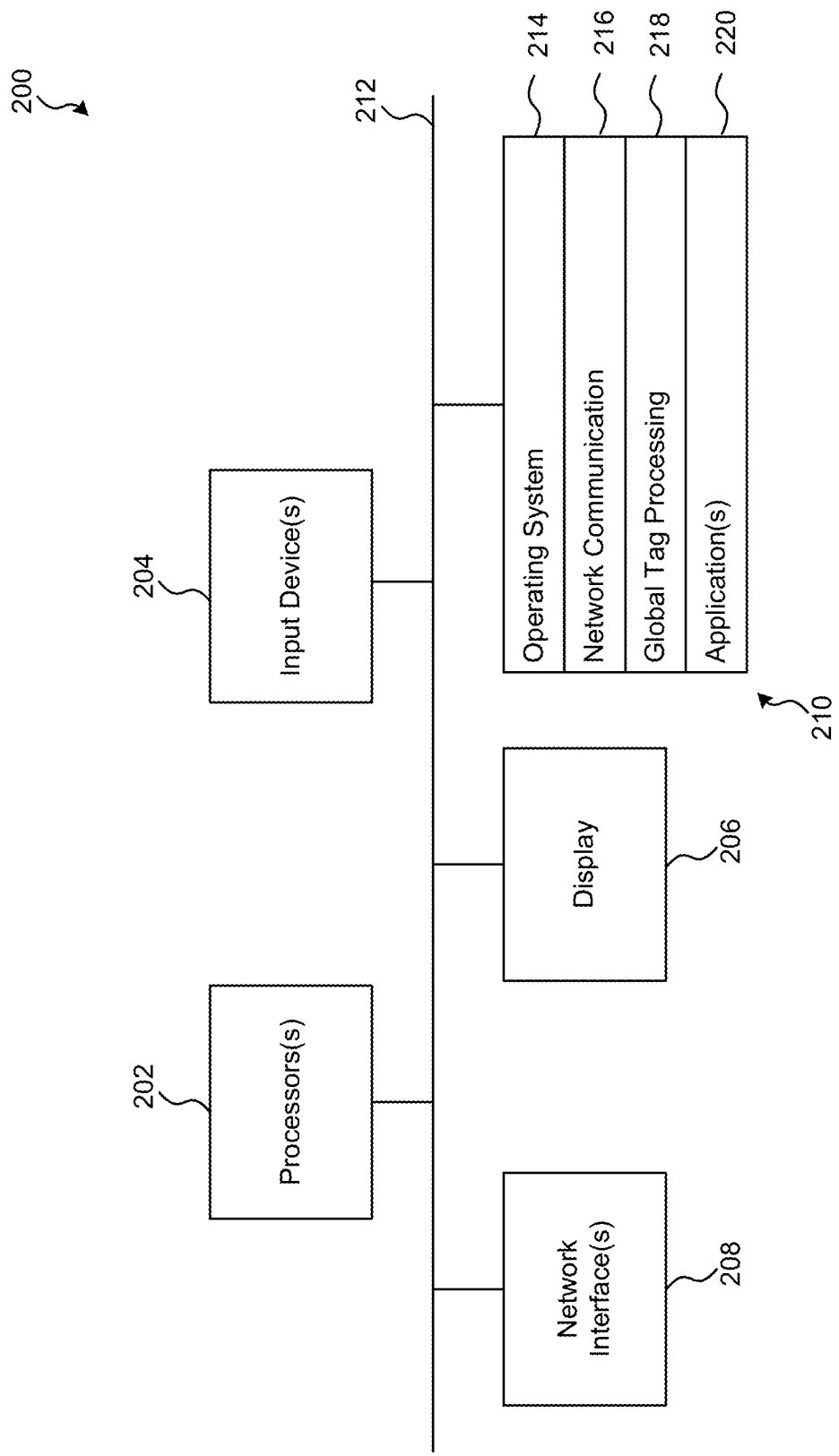
FIG. 2 shows a server device according to an embodiment of the present disclosure.

FIG. 2 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Global tag processing instructions 218 may include instructions that implement the disclosed global tag suggestion processing described herein. Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
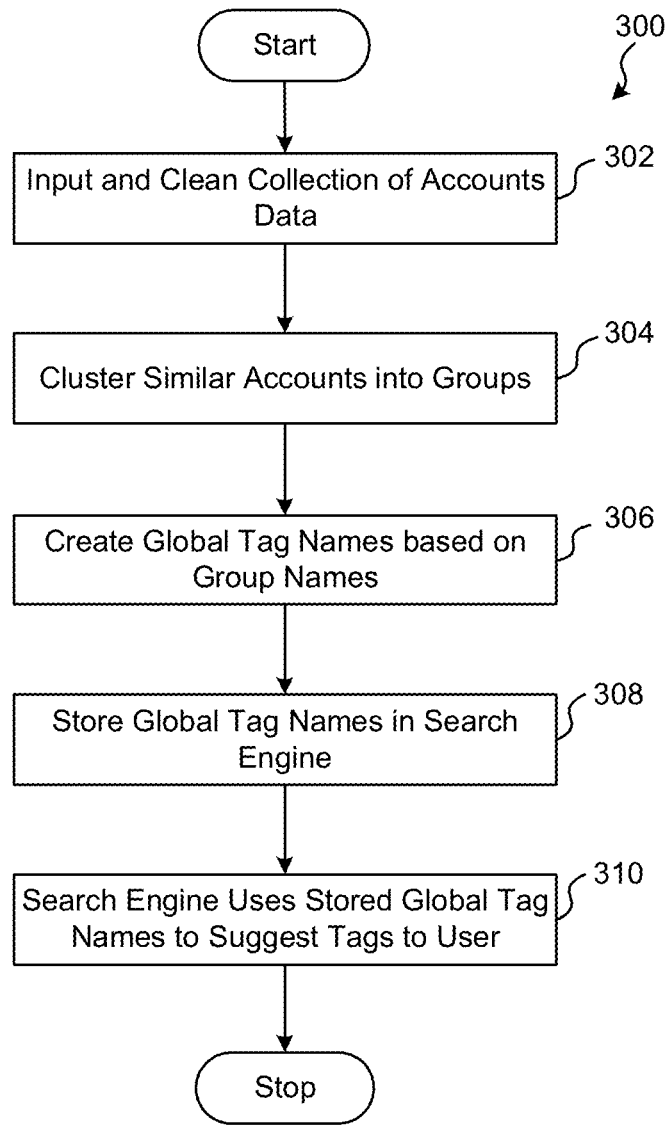
FIG. 3 shows an example process for providing global tag suggestions according to an embodiment of the present disclosure.

FIG. 3 illustrates an example process 300 for providing global tag suggestions in accordance with the principles disclosed herein. As discussed herein, the process 300 may assist a user to label its transactions for an electronic system or service such as an accounting system or service. In one embodiment, system 100 may perform some or all of the processing illustrated in FIG. 3. For example, first server 120 may execute the steps of the process 300 as part of the first service 122 (e.g., an accounting service). The first server 120 and or first service 122 may input and or use data from, or store global tags and or processed data in, one or more of the first database 124, second database 144 and or user device 150.

At step 302, the process 300 may input data from the collection of accounts of a plurality of users of the first service 122. In one or more embodiments, the data is collected from only select system users such as e.g., high quality and active users and or users with certain backgrounds as determined by a policy of the first service 122. For example, users having an accounting and or other financial background may be considered high quality users with the anticipation that these user are more likely to consistently label their accounts. Thus, as noted above, data from the collection of accounts of high quality users may provide a good source for global tags. This is particularly useful for a cold start of the first service 122 (i.e., when no global tags are in existence).

In one or more embodiments, the process 300 may also input data from the collection of accounts for active users (i.e., as defined above, users that access and update their accounts on a regular basis). In one or more embodiments, an active user may be a user who accesses his/her account at a predetermined rate or periodic such as e.g., daily, weekly, bi-weekly and or monthly. In accordance with the disclosed principles, it is anticipated that active users are more likely to consistently label their accounts as opposed to users that monitor their accounts infrequently (i.e., aperiodically or at a periodic rate that is slower than the predetermined periodic rate). Thus, as noted above, data from the collection of accounts of active users may provide a good source for global tags.

While the data input at step 302 is anticipated to provide a good source for the global tags based on the source of the data, the process 300 may also clean the input data at step 302 before further processing is performed using the data. For example, the process 300 may perform a spell check on the input data to correct the spelling of any of the account names. The process 300 may also delete stop words (e.g., the, is, at, which, on), other terms that may not be suitable for a tag (e.g., profanity), and or punctuation from the input data. Any suitable technique for cleaning up the input data may be used and the disclosed principles are not limited to when and how the input data is cleaned.

At step 304, the input data from the select system users (e.g., high quality and active users) may be clustered into groups. For example, the names of the accounts may be used in a clustering algorithm that may form groups of clustered accounts and then automatically generates clustered group names (e.g., clustered group names such as automobile expense, client gift, utility payment, etc.). Existing conventional clustering algorithms have the capability to generate names of the clustered groups based on e.g., properties of the group and or clusters within the group. In accordance with the disclosed principles, the identity and or name of the clustered groups may be used as the identity/name for the global tags created and used by the process 300. As is known in the art, cluster analysis or clustering is the task of grouping a set of objects in such a way that objects in the same group are more similar to each other than to those in other groups. The clustering at step 304 may be performed by any known clustering algorithm suitable for clustering text. For example, k-means clustering of the data may be used to form the groups. In one or more embodiments, the "Hierarchical Density-based spatial clustering of applications with noise" (HDBSCAN) algorithm may be applied on a bag-of-words or pre-trained account name embeddings to generate clusters.

In one or more embodiments, the group names may be checked to determine if they are suitable for the group. For example, a tax or other expert may review the contents of the group and apply names based on its expertise. Table 1 lists example global tags and the collection of accounts that may have been the basis for forming the global tags:

TABLE 1

| Collection of Accounts | Global Tag |
| --- | --- |
| dump, dump expense, dump trailer, dump truck, trash dump | dump fee |
| 401k contribution, employer 401k | 401k contribution |

TABLE 1-continued

| Collection of Accounts | Global Tag |
|---|---|
| contribution, employee 401k contribution, 401k contribution employee, payroll 401k contribution | |
| professional fee accounting, legal professional fee accounting, professional fee accounting fee, fee accounting, professional fee accounting tax | accounting |
| accounting bookkeeping, accounting bookkeeping fee, accounting bookkeeping service, accounting bookkeeping expense | Accounting bookkeeping |
| administration, payroll administration fee, payroll administration, administration fee, office administration | Admin fee |
| advertising promotional, advertising promotional marketing, advertising promotional material, advertising promotional website, advertising promotional expense | advertising promotional |
| beauty, health beauty, beauty supply, hair beauty, beauty product | Beauty |

At step 306, global tag names may be created using the group names from step 304. At step 308, the global tag names may be stored in a table and or one or more files that may be used by or be included within a search engine of the first service 122 to automatically suggest one or more global tags to the user. For example, the global tag names may be stored in a "synonyms.txt" or similar file used by known search engines such as e.g., Solr and Elasticsearch. It should be appreciated that the format used to store the global tags may depend on the search engine used by the first service 122 and that the disclosed principles are not limited to any specific manner or format for storing the global tags.

At step 310, when the user is entering a tag name into a field of a graphical user interface provided by the first service 122, the first service's search engine may access the synonyms table and or file (e.g., from step 308) to find one or more global tag names to suggest to the user. That is, when the user is typing and trying to create a new tag in a search box or other field, the process 300 may display the global tags that best matches the description/search terms being entered by the user. In one or more embodiments, up to five global tags may be suggested at the same time. In one or more embodiments, the suggested global tag or tags may be presented as a drop down menu proximate to the field the user is typing its text into. In one or more embodiments, a suggested global tag may be presented within the same field that the user is typing text into.

In one or more embodiments, the disclosed principles may update the collection of global tags with personalized tags developed by users over time. It is anticipated that as more users interact with the first service 122, more global tags may be useful and or that prior global tags may require some supplementing. In one or more embodiments, the updating may be done periodically (e.g., weekly, monthly, quarterly, semi-annually or yearly) as part of a maintenance or background feature of the first service 122.

Figure 4:
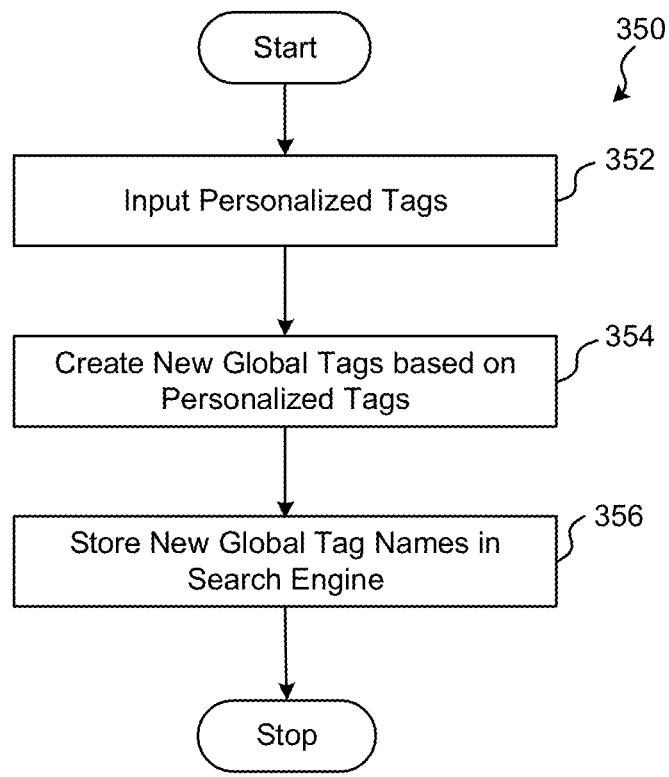
FIG. 4 shows an example process for updating global tags that may have been created by the process illustrated in FIG. 3.

One process 350 for updating global tags that may have been created by the process 300 described above is illustrated in FIG. 4. The process 350 may be performed by the system 100. For example, first server 120 may execute the steps of the process 350 as part of the first service 122 and or as part of a maintenance or background feature of the first service 122. The first server 120 and or first service 122 may input and or use data from, or store global tags and or processed data in, one or more of the first database 124, second database 144 and or user device 150.

At step 352, personalized tag names from users of the first service 122 may be input. In one or more embodiments, the process 350 only inputs personalized tag names from the select system users (e.g., high quality and or active users) as defined above for process 300. In one or more embodiments, the input personalized tag names may undergo a cleaning process similar to the one discussed above for step 302 (FIG. 3). At step 354, the names of the personalized tag names are used to create new global tags that will be made available to all users of the first service 122. As step 356, the new global tag names may be stored in the table and or one or more files that may be used by or be included within the search engine of the first service 122 in a similar way that the global tags were stored in step 308 (FIG. 3). As can be appreciated, once the new global tags are stored, they may be used by the first service 122 to automatically suggest one or more global tags to a user of the first service 122.

In one or more embodiments, either process 300 or 350 may group users by industry or any other attributes to generate global tags for each group of users differently. That is, users within the construction industry may be grouped together and may have a dedicated set of global tags for its group that may be different than users within the finance industry. To do so, the steps of process 300 use the industry and or attribute of each user (typically set in advance when the user sets up his/her account) as a filter and or selection mechanism when inputting, clustering, storing and using the determined tags. Likewise, the steps of process 350 may use the industry and or attribute of each user to determine where the new global tag (based on the personalized tag) will be stored.

In one or more embodiments, the process 350 may regularly aggregate similar personal tags across users with high usage, and add these tags to the global tags inventory. In addition, the process 350 may regularly aggregate similar personal tags across different users and add these tags to global tags inventory. Moreover, the process 350 may identify and mark inactive personal and or global tags (e.g., tags have not been used for 30 days or during the period since the last time process 350 was performed). In addition, the process 350 may seek feedback from users before marking a tag inactive (e.g. sending a message asking the user if he or she is still using an identified tag). In one or more embodiments, inactive tags may be removed to improve the accuracy of the process 300. For example, process 350 may include a step of determining whether any global tag has not been used by system users.

FIG. 5 illustrates a first example page 400 of an accounting user interface in accordance with the disclosed principles. The example page 400 includes a first portion 410 including column identifiers 412, 414, 416, 418, 420 for fields and text associated with a transaction listed within various columns within a second portion 430 of the page 400. For example, the first identifier 412 is associated with a transaction date column, the second identifier 414 is associated with a transaction identification column, the third identifier 416 is associated with a transaction amount column, the fourth identifier 418 is associated with a transaction type column, and the fifth identifier 420 is associated with a transaction category and tags column. In one or more embodiments, the column identifiers 412, 414, 416, 418, 420 may be selectable menus having options to filter and or sort the column entries in the second portion 430. For example, in the illustrated example, date column identifier 412 includes an graphical element (e.g., an arrow) for sorting the column entries in the second portion 430 by date (e.g., ascending or descending order).

In the illustrated example, the first portion 410 also includes a transactions pending status identifier 422 and a selector 424 for expanding the first portion 410 and or causing a new transaction page to be displayed so that a user may properly enter and or tag a transaction (discussed below). In the illustrated example, the transactions pending status identifier 422 shows that there are three (3) pending transactions.

In the illustrated example, the second portion 430 includes multiple rows 440a, 440b, 440c, 440d, 440e, 440f, 440g of transactions having information within the columns identified by the column identifiers 412, 414, 416, 418, 420. For example, the first row 440a includes a date 442 (e.g., "6/6/18") in the transaction date column, a transaction name 444 (e.g., "Amazon.com") and payment method 443 (e.g., "credit card") in the transaction identification column, an amount 446 (e.g., "−$35.00") in the transaction amount column, a type 448 (e.g., "business") in the transaction type column, and a category 450 (e.g., "Other business expenses") in the transaction category and tags column. In the illustrated example, the first row 440a also includes a graphical tag element 454 and a textual tag name 452 (e.g., "Customer gift"). In the illustrated example, the graphical tag element 454 is an indication that the text to the right of the element 454 is a tag name 452.

Figure 6:
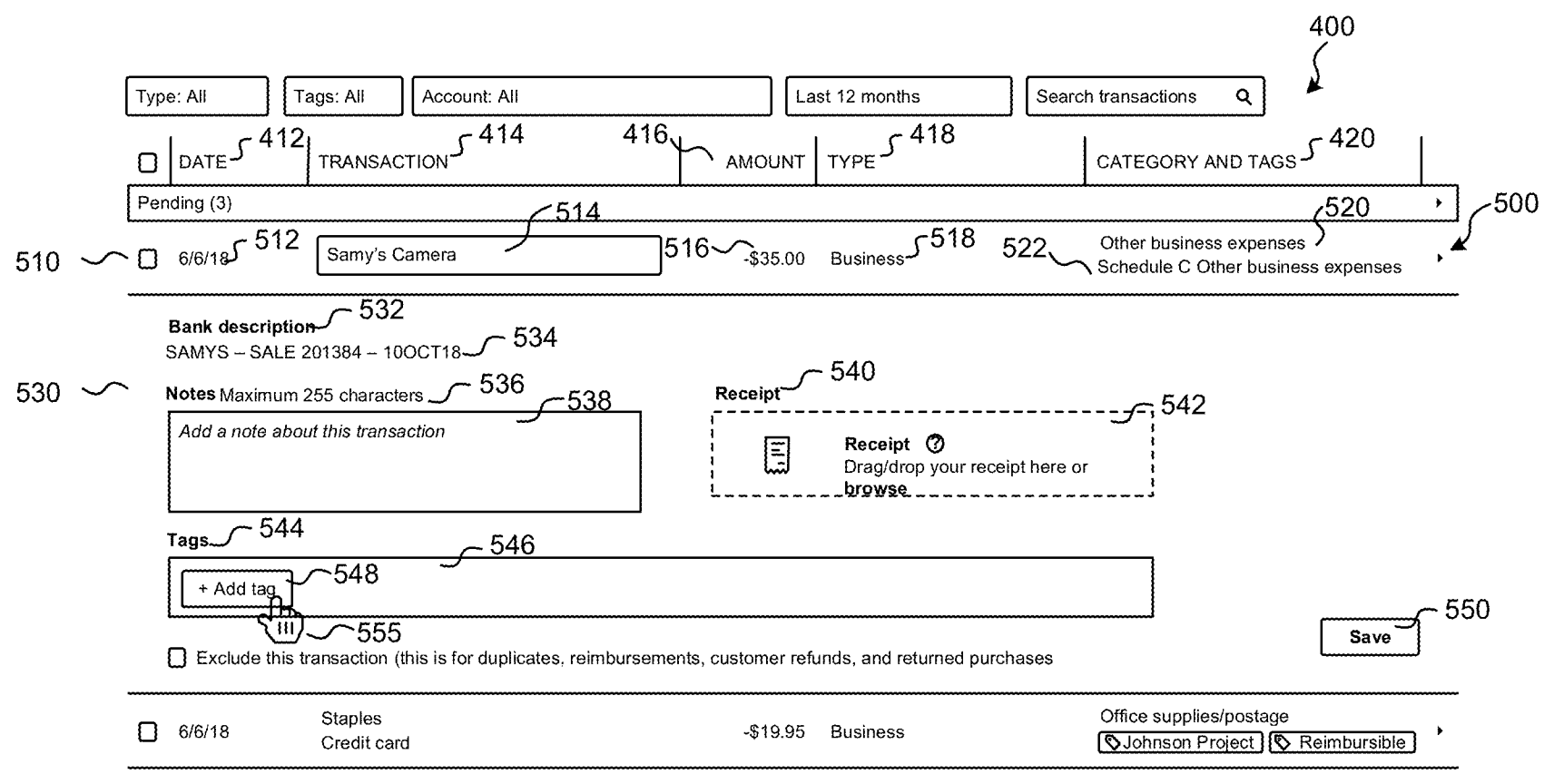

FIG. 6 illustrates an example of a transaction page 500 that may be provided over page 400 (or in a new window or page) when e.g., the selector 424 was selected from page 400. It should be appreciated that how the transaction page 500 is displayed and or how it was activated should by no means limit the principles disclosed herein.

In the illustrated example, the transaction page 500 includes a first portion 510 having fields 512, 514, 516, 518, 520, 522 for displaying and or entering information corresponding to the column identifiers 412, 414, 416, 418, 420. For example, the first portion 510 includes a date 512 (e.g., "6/6/18") in the transaction date column, a transaction name 514 (e.g., "Samy's Camera") in the transaction identification column, an amount 516 (e.g., "−$175.00") in the transaction amount column, a type 518 (e.g., "business") in the transaction type column, and a category 520 (e.g., "Other business expenses") in the transaction category and tags column. In the illustrated example, the first portion 510 also includes a field 522 identifying the transaction as "Schedule C Other business expenses" for tax purposes. As can be seen in the illustrated example, some fields are automatically filled in based on the transaction data and or prior entries by the user (e.g., date, amount, type, category), while field 514 is a form fillable field allowing the user to provide its own transaction identification information (e.g., "Samy's Camera").

In the illustrated example, the transaction page 500 includes a second portion 530 having fields 532, 534, 536, 538, 540, 542, 544, 546 for displaying and or entering additional transaction information. For example, a first field 532 is a label for the information displayed in the second field 534. In the illustrated example, the first field 532 contains the text "Bank description" and the second field 534 contains the entry "SAMYS—SALE201384—10OCT18" describing the transaction description from the bank. The third field 536 is a label for the fourth field 538. In the illustrated example, the third field 536 contains the text "Notes Maximum 255 characters" and the fourth field 538 is a user editable field to enter notes about the transaction or payment. The fifth field 540 is a label for the sixth field 542. In the illustrated example, the fifth field 540 contains the text "Receipt" and the sixth field 542 is a drag and drop area for the user to drag and drop (or select a link) the transaction's receipt.

In the illustrated example, seventh field 544 is the label "Tags" for the eighth field 546, which may allow a user to enter a tag in accordance with the disclosed principles. For example, the eighth field 546 includes a selector 548, which when selected by the user will cause a menu 600 (FIG. 7) of selectable options for adding, selecting and or entering one or more tags into field 546. FIG. 6 illustrates a mouse cursor 555 in the process of selecting the selector 548, which is labeled "+ Add tag". The illustrated example also includes a selector 550 that when selected allows the user to save the information entered into the transaction page 500.

Figure 7:
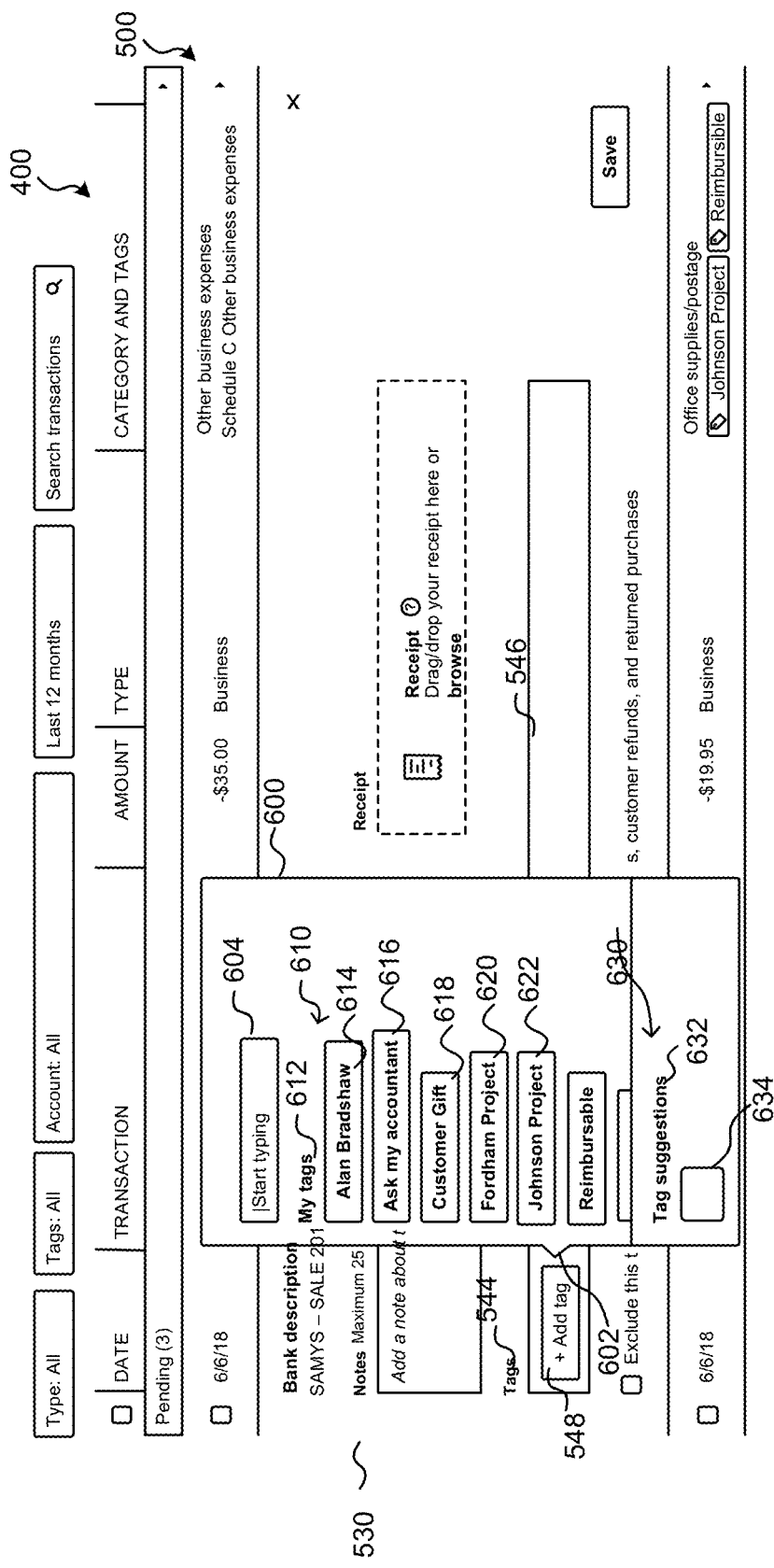

FIG. 7 illustrates an example menu 600 allowing a user to add, select and or enter one or more tags into field 546. In the illustrated example, a graphical indicator 602 is used to show that the menu 600 stemmed from, originated from and or popped out of the of field 546. Moreover, the graphical indicator 602 is used to connect the menu 600 to the field such that the menu 600, indicator 602 and field 546 are in the same screen view of the user interface. In the illustrated example, the graphical indicator 602 is a pop-out symbol. In one embodiment, an animation may be used to present the menu 600 over or adjacent the tag entering field 546.

In the illustrated example, the menu 600 includes a field 604 for the user to enter text for a tag name (e.g., currently displaying "Start typing"). In one or more embodiments, and as shown in FIG. 7, a listing 610 of the user's existing tags may be included in the menu 600. For example, the listing 610 may include a label 612 identified as "my tags" followed by tags 614, 616, 618, 620, 622 the user has already used. If desired, the user may select one of these tags 614, 616, 618, 620, 622 instead of entering text in field 604.

Figure 8:
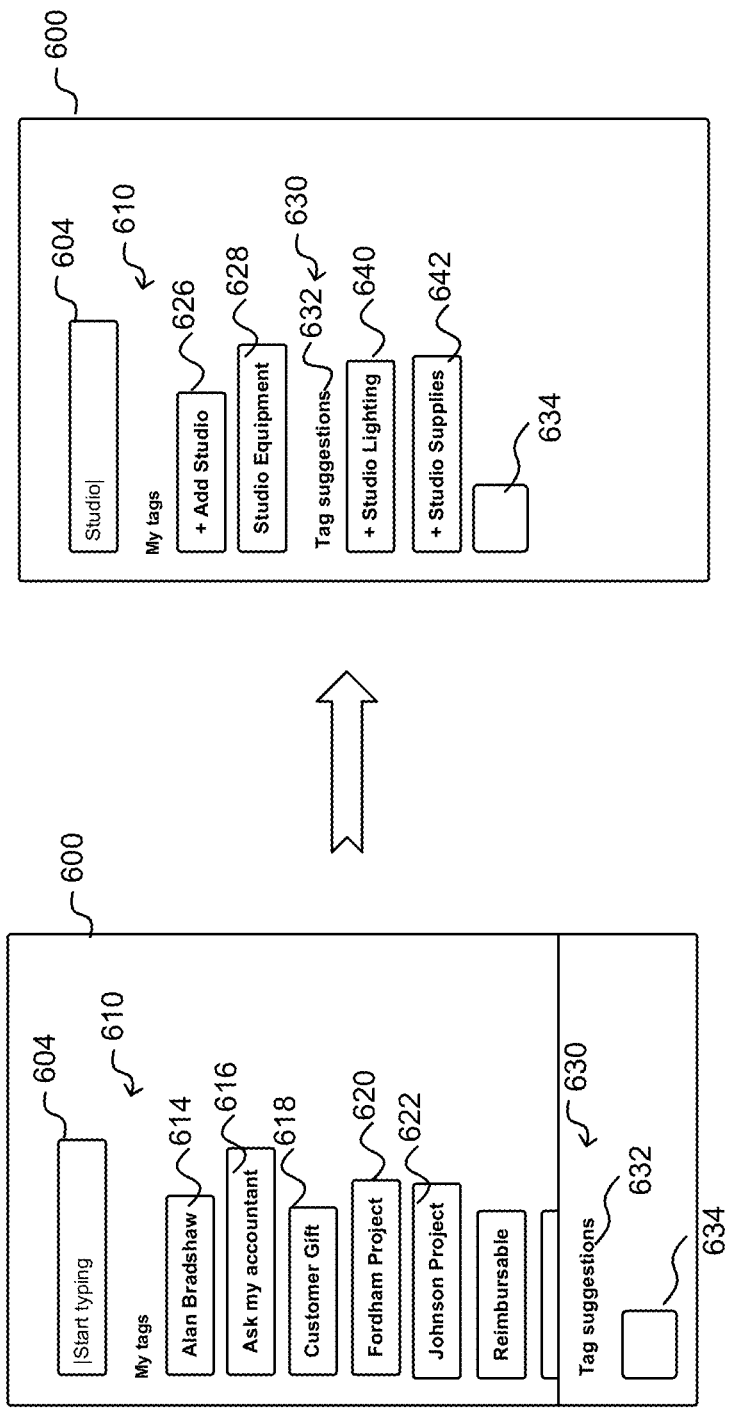

In the illustrated example, the menu 600 includes a tag suggestions portion 630 having a label 632 and a graphical indicator 634. The label 632 identifies the portion 630 (e.g., "Tag suggestions"). Since the user has not started typing, the illustrated portion 630 uses the graphical indictor 634 as an indication of something more to come. However, once the user starts typing text into field 604, the tag suggestions portion 630 may begin to populate with global tag suggestions in accordance with the principles disclosed herein. For example, as shown in FIG. 8, as the user types "Studio" in field 604, the tag suggestions portion 630 updates with two selectable fields 640, 642 that may be used to select one or more global tags suggested by the disclosed systems and processes. In the illustrated example, field 640 is labeled "Studio lighting" and field 642 is labeled "Studio supplies". As can be appreciated, the labels used in fields 640, 642 correspond to global tags determined in accordance with the disclosed principles.

Figure 9:
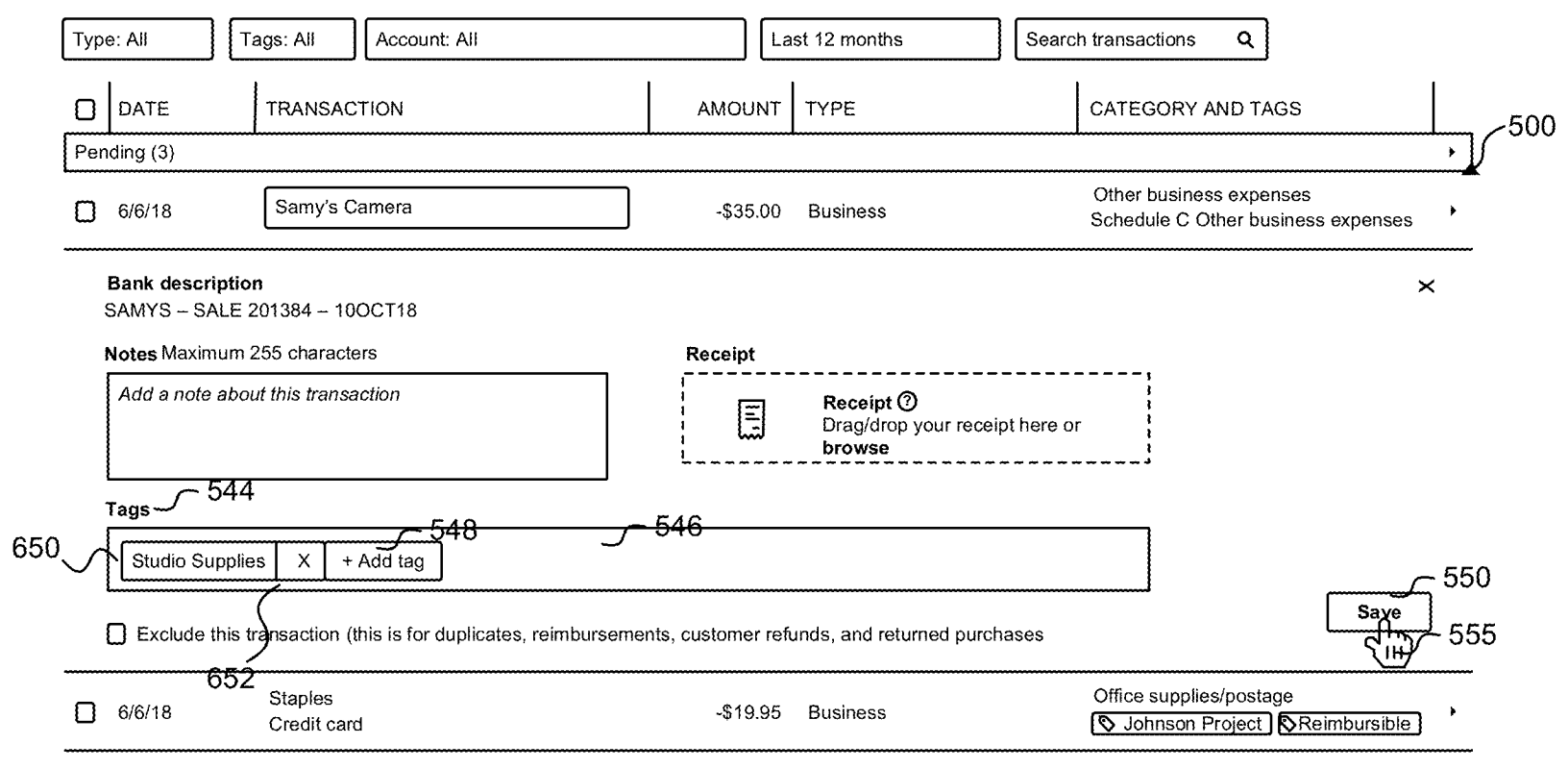

If the user selects one of the global tag suggestions via fields 640, 642, the tag field 546 within the transaction page 500 may be updated as shown in the example illustrated in FIG. 9. In the illustrated example, it is presumed that the user selected the "Studio supplies" field 642 from the tag suggestions portion 630 (FIG. 8). As shown in FIG. 9, tag field 546 now includes a tag 650 identified as "Studio supplies". In the illustrated example, a graphical selector 652 (e.g., "X") is also displayed and when selected, allows the tag 650 to be removed from the field 546. As shown in FIG. 9, the user has decided to save the information on page 500 by selecting the save field 550 with the cursor 555.

FIG. 10 illustrates an example of an updated first page 400a of the accounting user interface previously illustrated in FIG. 5. As can be seen the revised first page 400a includes an updated second portion 430a including a new row 700 associated with the "Samy's Camera" transaction the user entered via page 500. For example, the new row 700 includes a date 702 (e.g., "6/6/18") in the transaction date column, a transaction name 704 (e.g., "Samy's Camera") and payment method 703 (e.g., "credit card") in the transaction identification column, an amount 706 (e.g., "–$175.00") in the transaction amount column, a type 708 (e.g., "business") in the transaction type column, and a category 710 (e.g., "Other business expenses") in the transaction category and tags column. In the illustrated example, the new row 700 also includes a graphical tag element 714 and a textual tag name 712 (e.g., "Studio supplies") for the global tag that was suggested to the user.

As can be appreciated, the disclosed systems and processes provide several advantages over conventional electronic accounting and financial services. For example, global tags that are accessible to all users of the service may be created based on data from trusted users. The data may be cleaned to remove typographical errors, punctuation, duplication and other issues that may affect the creation of a key set of global tags. By creating a concise set of global tags, the disclosed principles reduce storage requirements that would otherwise be necessary to store duplicate and erroneous tags. Furthermore, the global tags may be easily supplemented (e.g., adding new tags and or removing inactive tags) based on further system usage as part of system maintenance and or background processing.

In addition, the layout and content of the disclosed user interfaces and tag suggestion menu provide the user with the ability to interact with and accept one or more suggested tags from a single screen. That is, the user is not directed to a different page even though additional information is being provided. For example, the contents of the disclosed screen may transition from a fillable form to a general menu and then to a global tags suggestion all within the same screen view. Accordingly, system users are provided with an interactive and graphical user interface that provides all necessary interfaces in one screen and with a limited and or specific amount of data via the interfaces provided by the disclosed principles.

Moreover, the disclosed tag suggestion process is an improvement of the current state of the art as it may help ensure that transaction data is properly tagged by suggestion accurately label tags as opposed to a user entering incorrect and or duplicate tags. As can be appreciated, the advantages to system users may include clean (e.g., free from errors and duplication) and well-organized reports and insights benefiting their bookkeeping and tax preparation processes. Advantages for the service provider may include freed-up storage resources, easy to implement suggestions (e.g., via the search engine), storage and use of user and system data that is clean that can be used to obtain better analytical product insights and provide more powerful machine learning support. As such, the disclosed systems and processes are an advancement in the electronic accounting and financial services fields.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of providing global tags for labeling transactions in an electronic accounting system, said method being performed on a-first network accessible server, said method comprising:
    inputting a collection of accounts data associated with a plurality of users of the electronic accounting system from a database included in the first network accessible server, the electronic accounting system implemented using a second network accessible server;
    clustering accounts within the input collection of accounts data into groups using a clustering algorithm, the clustering algorithm clustering the accounts data into groups based on a similarity of each piece of accounts data in a particular group relative to accounts data clustered in other groups and providing a group name to each clustered group based on one or more properties of each group;
    generating global tag names based on the clustered group names;
    inputting the generated global tag names into a search engine included in the first network accessible server;
    displaying a graphical user interface on a user device connected to the first network accessible server;
    receiving a text string typed by a user in a field of the graphical user interface; and
    using the search engine to provide at least one global tag suggestion to the graphical user interface as the user is in a process of tagging a transaction within the user interface, the at least one global tag suggestion based on the generated global tag names that best match the text string typed by the user.

2. The method of claim 1, wherein inputting the collection of accounts data comprises:
    determining whether the collection of accounts data is associated with a particular user having a predetermined background; and
    inputting the collection of accounts data associated with the particular user having a predetermined background.

3. The method of claim 1, wherein inputting the collection of accounts data comprises:
    determining whether the collection of accounts data is associated with a particular user that accesses the system at or greater than a predetermined rate; and
    inputting the collection of accounts data associated with the particular user that access the system at or greater than the predetermined rate.

4. The method of claim 1, wherein inputting the collection of accounts data comprises:
   correcting typographical errors within the input collection of accounts data; and
   removing stop words from the input collection of accounts data.

5. The method of claim 1, wherein inputting the generated global tag names into the search engine comprises storing the generated global tag names in a file accessible by the search engine.

6. The method of claim 1, wherein the user tags a transaction by inputting text into a first field of the graphical user interface and the at least one global tag suggestion is provided in a menu proximate to the first field and in a same screen view as the first field of the graphical user interface as the user is in the process of inputting text into the field.

7. The method of claim 1, further comprising:
   inputting personalized tags associated with the select system users from the database;
   generating additional global tag names based on the input personalized tags; and
   inputting the generated additional global tag names into the search engine.

8. The method of claim 7, wherein said step of inputting personalized tags associated with the plurality of users of the electronic accounting system from the database to said step of inputting the generated additional global tag names into the search engine are performed at a predetermined periodic rate.

9. A system for providing global tags for labeling transactions of an electronic accounting service provided by the system, said system comprising:
   a first network accessible server connected to a database comprising accounts data for a plurality of users of the electronic accounting service, the electronic account system implemented using a second network accessible server connected to the first network accessible server;
   the first network accessible server configured to:
      input, from the database, a collection of accounts data associated with multiple users selected from the plurality of users;
      cluster accounts within the input collection of accounts data into groups using a clustering algorithm, the clustering algorithm providing a group name to each clustered group;
      generate global tag names based on the clustered group names;
      aggregate multiple personalized tags from the electronic accounting system, the personalized tags corresponding to one or more user-defined tags associated with the at least one of the plurality of users of the electronic accounting system;
      generate additional global tag names based on the multiple personalized tags;
      input the generated global tag names and the generated additional global tag names into a search engine included in the first network accessible server;
      display a graphical user interface on a user device connected to the first network accessible server;
      receive a text string typed by a user in a field of the graphical user interface; and
      use the search engine to provide at least one global tag suggestion to the graphical user interface as the user is in a process of tagging a transaction within the user interface, the at least one global tag suggestion based on the generated global tag names or the generated additional global tag names that best match the text string typed by the user.

10. The system of claim 9, wherein the first network accessible server is configured to input the collection of accounts data by:
   determining whether the collection of accounts data is associated with a particular user having a predetermined background; and
   inputting the collection of accounts data associated with the particular user having a predetermined background.

11. The system of claim 9, wherein the first network accessible server is configured to input the collection of accounts data by:
   determining whether the collection of accounts data is associated with a particular user that accesses the system at or greater than a predetermined rate; and
   inputting the collection of accounts data associated with the particular user that access the system at or greater than the predetermined rate.

12. The system of claim 9, wherein the first network accessible server is configured to input the collection of accounts data by:
   correcting typographical errors within the input collection of accounts data; and
   removing stop words from the input collection of accounts data.

13. The system of claim 9, wherein the first network accessible server is configured to input the generated global tag names and the generated additional global tag names into the search engine by storing the generated global tag names and the generated additional global tag names in a file accessible by the search engine.

14. The system of claim 9, wherein the user tags a transaction by inputting text into a first field of the graphical user interface system and the first network accessible server is configured to provide the at least one global tag suggestion in a menu proximate to the first field and in a same screen view as the first field of the graphical user interface as the user is in the process of inputting text into the field.

15. The system of claim 9, wherein the network accessible server is configured to perform the steps: aggregate the personalized tags from the electronic accounting system and generate the additional global tag names based on the multiple personalized tags at a predetermined periodic rate.

16. A computer implemented method of providing global tags for labeling transactions in an electronic accounting system, said method being performed on a-first network accessible server, said method comprising:
   inputting a collection of accounts data associated with a plurality of users of the electronic accounting system from a database included in the first network accessible server, the electronic accounting system implemented using a second network accessible server connected to the first network accessible server;
   correcting typographical errors within the input collection of accounts data;
   clustering accounts within the input collection of accounts data into groups using a clustering algorithm, the clustering algorithm clustering the accounts data into groups based on a similarity of each piece of accounts data in a particular group relative to the accounts data clustered in other groups and providing a group name to each clustered group based on one or more properties of each group;
   generating global tag names based on the clustered group names;

storing the generated global tag names in a file accessible by a search engine included in the first network accessible server;

displaying a graphical user interface on a user device connected to the first network accessible server;

receiving a text string typed by a user in a field of the graphical user interface; and using the search engine to provide at least one global tag suggestion to the graphical user interface as the user is in a process of tagging a transaction within the graphical user interface, the at least one global tag suggestion based on the generated global tag names best match the text string typed by the user.

17. The method of claim 16, wherein inputting the collection of accounts data comprises:

determining whether the collection of accounts data is associated with a particular user having a predetermined background; and inputting the collection of accounts data associated with the particular user having a predetermined background.

18. The method of claim 16, wherein inputting the collection of accounts data comprises:

determining whether the collection of accounts data is associated with a particular user that accesses the system at or greater than a predetermined rate; and inputting the collection of accounts data associated with the particular user that access the system at or greater than the predetermined rate.

* * * * *